United States Patent [19]

John

[11] Patent Number: 4,941,932

[45] Date of Patent: Jul. 17, 1990

[54] METHOD FOR SEALING A CABLE BUNDLE IN LONGITUDINAL DIRECTION

[75] Inventor: Gunther John, Hamburg, Fed. Rep. of Germany

[73] Assignee: Minnesota Mining and Manufacturing Company, St. Paul, Minn.

[21] Appl. No.: 371,516

[22] Filed: Jun. 26, 1989

[30] Foreign Application Priority Data

Jul. 9, 1988 [DE] Fed. Rep. of Germany ....... 3823312

[51] Int. Cl.$^5$ ........................................... H01B 13/06
[52] U.S. Cl. ...................................... 156/48; 156/49; 174/76; 174/90; 174/116
[58] Field of Search ...................... 156/48, 49; 174/24, 174/76, 90, 116

[56] References Cited

U.S. PATENT DOCUMENTS

| | | | |
|---|---|---|---|
| 4,466,843 | 8/1984 | Shimirak | 156/48 |
| 4,511,415 | 4/1985 | Dienes | 156/48 |

*Primary Examiner*—Robert A. Dawson
*Attorney, Agent, or Firm*—Donald M. Sell; Walter N. Kirn; Gerald F. Chernivec

[57] ABSTRACT

A method for sealing the interstices between individual cables of a cable bundle to achieve the sealing of the cable bundle in the longitudinal direction applying a liquid resin system to the area between the cables, the system comprising the reaction of a polyisocyanate and at least one fatty acid polyol having a hydroxy number of at least about 150 and an acid number of no greater than about 1.0, followed by curing thereof to a non-flowable state.

7 Claims, No Drawings

METHOD FOR SEALING A CABLE BUNDLE IN LONGITUDINAL DIRECTION

The invention relates to a method for sealing the interstices between individual cables of a cable bundle to establish a seal for the cable bundle in the longitudinal direction thereof.

BACKGROUND ART

It is known to collect the control and supply conduits in electrical devices, for example, in electrical washing machines for dishes or clothes, etc. as well as in automotive vehicles, to cable bundles or to a cable harness. In many cases such a cable harness is preformed by the manufacturer of the device or of the automotive vehicle. The individual cables are typically held together by means of an adhesive tape or by a cable band of plastic material and fixed within the interior of the device by means of a suitable retainer.

Often, a problem arises when such a cable harness is to be extended through a wall which separates two compartments from each other, e.g., the engine compartment of an automobile from the driver compartment. It is clear that the cable harness is sealed in a grommet to prevent the passage of water and air. However, the closely collected cables, which at least partially are of relatively small diameter, define small passages therebetween in the longitudinal direction of the cable bundle, thus creating a capillary effect. Despite the mentioned sealing, therefore, moisture can enter the driver compartment of an automobile from the engine compartment and thus contact the various instrumentation in the driver compartment. This may cause corrosion in the contact areas. Further, the danger of current leakages or even of a short circuit exists.

In the case of supply conduits which carry a relatively large current, the failures caused by such phenomena are relatively small. However, a plurality of electrical devices, above all the electronic components and devices used in the manufacture of automotive vehicles, are relatively sensitive. They require a small voltage, of for example 12 Volts, and an extremely small current so that changes in the current may easily lead to a falsification of the signals.

For the above reasons, considerable efforts are undertaken to seal cable harnesses in their longitudinal direction and to cut off this capillary effect.

It is known to pour a thermosetting adhesive between the individual cables of a cable harness for this purpose. It is further known to use an intumescent thermosetting adhesive and to cover the area to be sealed with a hose of heat-shrinkable plastic material. The thermosetting adhesive is cast at relatively high temperatures and cures relatively fast after coming in contact with the cable sheath, so that the danger of cavities remaining cannot be excluded. Cable harnesses which are sealed in their longitudinal direction according to the described method thus have a relatively high failure rate.

SUMMARY OF THE INVENTION

In accordance with the invention, there is provided a method for sealing a cable bundle contained within a cable harness in the longitudinal direction thereof, comprising applying to the area to be sealed a curable liquid resin system comprising the reaction product of a polyisocyanate and at least one fatty acid polyol having a hydroxyl number of at least about 150 and an acid number of no greater than about 1.0, followed by curing thereof to a non-flowable state. Preferably, the resin system also contains desired adjuvants, such as a cross-linking agent, a water-absorbent material, and a surface-active agent.

DETAILED DESCRIPTION

As known, casting resins are liquid synthetic resin systems or mixtures of substances which can be cast into molds without pressure and cured therein to a rigid chemically and mechanically resistant substance which is also resistant to deformation from heat. They are used in the electric industries to a large extent. For example, they serve to insulate cable connections. They have remarkable electrical properties and prevent the penetration of moisture.

For example, an epoxy resin or a polyurethane resin are examples of casting resins. For the production of polyurethane resins, for example, polyester or polyether alcohols are used which react with a polyisocyanate. To achieve the desired properties, further substances are admixed, e.g., molecular sieves for the absorption of moisture; surface-active substances, e.g., silicone oil, in order to achieve a degasifying and a reduction of the surface tension during the casting process or to provide a bubble-free casting mass and the complete creeping into the cavities, respectively. Further, accelerators can be used to achieve a high production rate, e.g., in the form of tertiary amines, metal salts or the like.

Despite the good properties of casting resins, they have not been applied to the longitudinal sealing of cable bundles. In testwise applications, it has turned out that the casting resin does not sufficiently adhere to the cable sheath, which in the case of cables manufactured by mass production normally consists of PVC. To the contrary, such cables can be easily retracted from a cast resin block. Presumably, the lack of adhesion is caused by the plasticizer which is added to the PVC to a relatively large extent. By means of a high content of plasticizer, cable wires and stranded wires can be coated with high velocity. During the extrusion, the plasticizer deposits in the radial outer portion of the cable sheath. There it forms a sort of separation film which prevents sufficient adhesion of the casting resin.

With the present invention, it has been recognized that the substitution for polyester or polyether in conventional polyurethane cast resins by at least one fatty acid polyol, wherein the polyol has a hydroxyl number of at least about 150, and preferably at least about 190, and an acid number of no greater than about 1.0, the casting resin can effectively adhere to the cable sheath. This adhesion surprisingly is so strong that a PVC-sheath is torn-off, rather than the casting resin being unbound from the sheath.

From U.S. Pat. No. 4,168,363 it is known to form a casting resin by a polyol and a polyisocyanate wherein the polyol includes 1 to 3 hydroxyl groups. This known casting resin is taught to be used for repairs of cable sheaths of neoprene. Cables coated with neoprene are used in mining. This known casting resin, however, is also not suitable for sealing of cable bundles in their longitudinal direction because it also does not provide the required adhesion.

With the casting resin according to the invention, the cost of the material is significantly higher than for conventional casting resin. However, the necessary amount for the sealing of cable bundles is relatively small. Further, with the method according to the invention, a significantly higher degree of automatization is achieved if compared with the conventional sealing process, so that despite of the relatively expensive material, the total expenses are reduced.

The process of the invention can be carried out by conventional means, particularly by means of a split mold through which the cable bundle is extended, the area to be sealed being in the mold cavity. By including a suitable surface-active agent, the liquid casting resin creeps into all interstices to achieve a complete sealing in the longitudinal direction after the curing. With a corresponding selection for a curing agent and an accelerator, a relatively high production rate can be achieved, the cutting for example only needing 4 to 5 minutes.

The casting resin according to the invention has a high resistivity against liquid media and only a very small water absorption capability.

An example for a casting resin composition for a method according to the invention is indicated herebelow comprised of components A and B:

| | Component A |
|---|---|
| 88.305% | Sovermol 650 NS Fa. Henkel polyol basing on polymeric fatty acids |
| 4.770% | Dipropylenglycol Fa. Biesterfeld di-functional polyol |
| 0.400% | Thixeseal 1084 Fa. Kronos Titan anti-depositing agent |
| 4.000% | Purmol Powder 3 ST Fa. Finma-Chemie molecular sieve for water absorption |
| 1.000% | Irganox 10786 Fa. Ciba Geigy stabilizing agent against oxidation |
| 0.050% | Antifoaming means SH Fa. Wacker additive including silicone for reducing the surface tension |
| 1.300% | Black carbon paste LB 867 LV Fa. Beit and Co. black colour paste |
| 0.130% | DABCO Fa. Houndry Huls tertiary amine to accelerate the curing reaction |

| | Component B | |
|---|---|---|
| 73.80% | Baymidur K 88 hr Fa. Bayer polymeric isocyanate | |
| 26.00% | Niax 2025 Fa. Union Carbide polypropylene glycol | |
| 0.20% | Black carbon paste LB 867 LV black color paste | |
| Mixing proportion: | | 100 weight parts A 70 weight parts B |
| Gel. time at 23° C.: (90 g) | | 4 to 5 minutes |

According to a preliminary instruction sheet of the firm Henkel, Sovermol 650 NS is an unsaponifiable polyol including mainly primary hydroxyl groups and having the following dates:

| Hydroxy number | approx. 190 (corresponds to nearly 5.7% hydroxy content) |
|---|---|
| Acid number | below 1 |
| Density at 20° C. | approx. 0.92 g/cm$^3$ |
| Viscosity at 20° C. | approx. 5000 mPa.s |
| Water content | below 0.1% |

Some samples made with the process according to the invention have been tested and provide the following properties:

| Tests | Method | Unit | Result |
|---|---|---|---|
| Density | | | |
| Component A | DIN 53 479 | g/ml | 0.94 |
| Component B | | | 0.18 |
| Component A + B | | | |
| Viscosity | | | |
| Component A | DIN 16 945 | mPa.s | 5500–6500 |
| Component B | | | 1200–2000 |
| Gelling Time 100 ml at 23° C. | VDE 0291 P2 | min | 4–5 |
| Tensile Strength | DIN 53 455 | N/mm$^2$ | 16.7 |
| Breaking Strength | DIN 53 455 | % | 103 |
| Pressure Test 30% Compression | DIN 53 454 | N/mm$^2$ | 14.63 |
| Residual Deformation after 24 h relief | DIN 53 454 | % | 0 |
| Shore-Hardness D | DIN 53 505 | — | 45 |
| Water Absorption after 24 h at 23° C. | DIN 53 495 | mg | 11 |
| Loss Factor | VDE 0303 P4 | | |
| at 23° C. | | — | 0.0526 |
| at 80° C. | | — | 0.1475 |
| Dielectric Constant | VDE 0303 P4 | | |
| at 23° C. | | — | 3.3 |
| at 80° C. | | — | 5.1 |
| Breakdown Voltage at 23° C. | DIN 53 481 | kV/mm | 37.1 |
| Creepage Resistance | VDE 0303 P1 | — | >CTJ 600 |

What is claimed is:

1. A method for sealing the interstices between individual cables of a cable bundle to achieve a sealing of said cable bundle in the longitudinal direction thereof, comprising applying a curable liquid resin system to the area between said cables, said resin system comprising the reaction product of a polyisocyanate and at least one fatty acid polyol having a hydroxyl number of at least about 150 and an acid number of no greater than about 1.0, followed by curing thereof to a non-flowable state.

2. The method of claim 1, wherein said fatty acid polyol has a hydroxyl number of 190 and an acid number below 1.

3. The method of claim 1, wherein said fatty acid polyol is unsaponifiable.

4. The method of claim 1, wherein said fatty acid polyol predominantly contains primary hydroxyl groups.

5. The method of claim 1, wherein said liquid resin system further contains an effective amount of a cross-linking agent.

6. The method of claim 1, wherein said liquid resin system further contains an effective amount of a surface-active agent.

7. The method of claim 1, wherein said liquid resin system further contains an effective amount of a water-absorbent material.

* * * * *